March 1, 1938.　　F. G. THWAITS　　2,109,870
EMERGENCY VALVE
Filed Dec. 20, 1935

INVENTOR.
F. G. Thwaits
BY Morsell, Lieber & Morsell
ATTORNEYS.

Patented Mar. 1, 1938

2,109,870

UNITED STATES PATENT OFFICE 2,109,870

EMERGENCY VALVE

Frederick G. Thwaits, Wauwatosa, Wis., assignor to The Heil Co., Milwaukee, Wis., a corporation of Wisconsin Application December 20, 1935, Serial No. 55,426

6 Claims. (Cl. 137—21)

The present invention relates in general to improvements in the art of dispensing liquid, and relates more specifically to improvements in the construction and operation of emergency valves for normally permitting withdrawal of inflammable liquid from storage compartments while preventing escape of the liquid in case of fire.

Generally defined, an object of the present invention is to provide an improved valve structure which is simple and compact in construction, and which is moreover highly effective in operation.

In order to diminish fire hazard, it is necessary under the laws of most localities, to provide safety appliances for preventing delivery of inflammable liquids from storage receptacles in case a fire is started near such receptacles. Many different types of so-called emergency valves have heretofore been proposed and used for this purpose, and especially in connection with oil and gasoline truck tanks having one or more liquid storage compartments therein. These emergency valves are adapted to be maintained open during normal dispensation of liquid from the compartments with which they are associated, and are capable of being quickly closed in cases of emergency. The prior devices of this kind are either too complicated in structure, or inefficient in operation, and in most cases are susceptible to undesirable leakage, thus making all of the prior emergency valve assemblages relatively objectionable.

It is therefore a more specific object of the present invention to provide an improved emergency valve especially applicable to truck tanks or the like, which obviates the objectionable features of the prior valve assemblages and which effectively performs its intended function.

Another specific object of the present invention is the provision of an extremely simple and compact emergency valve structure, which can be readily applied to storage tanks and which is relatively leak proof.

A further object of the invention is to provide a new and useful emergency valve assemblage adapted to be attached to the lower portion of elongated tanks, so as to permit actuation of the valve from either side of the tank, and also through openings at the top of the receptacle.

Still another specific object of the invention is to provide improved seals or packings for an emergency valve structure, whereby danger of leakage is minimized at all times.

An additional specific object of the invention is the provision of improved valve actuating mechanism for enabling operation of emergency valves or the like from a distant station.

A further object of the present invention is to provide an improved durable valve assemblage, which can be manufactured at moderate cost, and which may moreover be readily installed or removed.

These and other objects and advantages of the present invention will be apparent from the following detailed description.

A clear conception of embodiments of the several features constituting the present improvement, and of the mode of constructing and of manipulating emergency valves built in accordance with the present invention, may be had by referring to the drawing accompanying and forming a part of this specification wherein like reference characters designate the same or similar parts in the various views.

Figures 1, 2, 3:
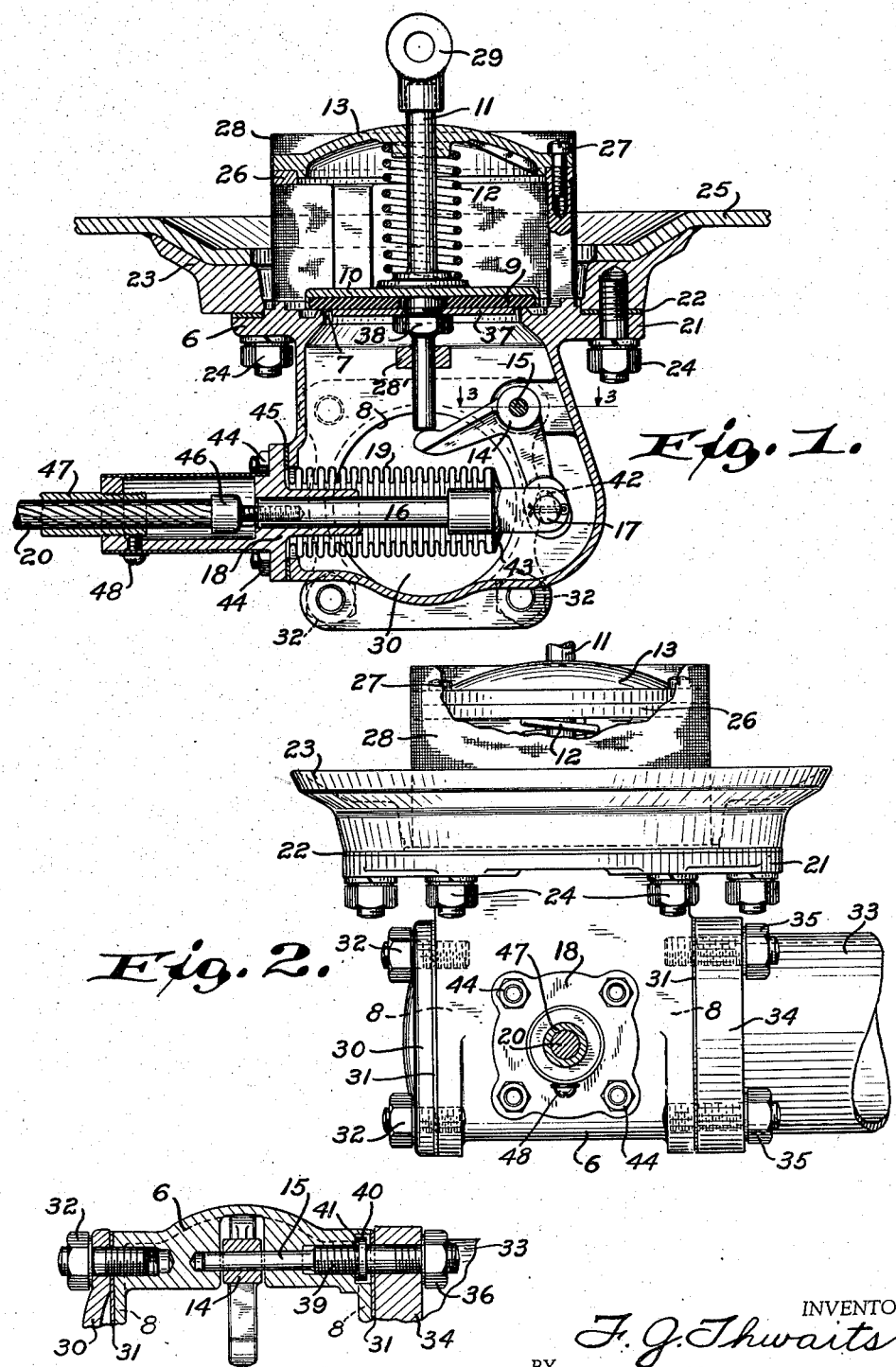
Fig. 1 is a central vertical section through one of the improved emergency valves showing the same applied to the lower portion of a storage tank, the valve being closed.
Fig. 2 is a side elevation of the emergency valve, a portion of the assemblage having been broken away.
Fig. 3 is a fragmentary transverse horizontal sectional view, taken along the line 3—3 of Fig. 1.

While the improved features constituting the present invention are especially advantageous when applied to emergency valves for liquid transporting and dispensing truck tanks, it is not desired to unnecessarily restrict the scope or possible use of the improvements, by virtue of limitations or specific descriptive terms used in this specification.

Referring to the drawing, the improved emergency valve assemblage shown therein, comprises in general a main valve casing 6 having an annular upper valve seat 7 and oppositely disposed and alined liquid conducting openings 8 formed in the lower portion thereof; a valve disk 9 confined within a valve cap 10 carried by a stem 11, and movable toward and away from the seat 7; a helical compression spring 12 embracing the stem 11 and coacting with a cover 13 secured to the casing 6 and with the valve cap 10 to constantly urge the disk 9 toward the seat 7; a bell-crank 14 swingably mounted upon a transverse pivot 15 and having one arm engageable directly with the lower extremity of the valve stem 11; a reciprocable actuating rod 16 pivotally attached to the other arm of the bell-crank 14 by a pin 17 and slidably engaging a bearing member 18 secured to the casing 6 between the openings 8; a bellows seal 19 connecting the rod 16 with the bearing member 18; and a valve operating cable or rod-like element 20 operatively attached to the rod 16.

The main valve casing 6 has an integral flange 21 near the valve seat 7, adapted for coaction with a sealing gasket 22, and for attachment to a supporting ring 23 by means of studs, lock washers and nuts 24. The ring 23 may be rigidly secured to the lower portion of a tank 25 by welding or otherwise, and the gasket 22 serves to positively prevent leakage of liquid between the casing flange 21 and the ring 23, while the nuts 24 permit convenient external attachment or removal of the valve unit. The upper integral cage portion 26 of the valve casing 6, to which the cover 13 is detachably secured by means of screws 27, is embraced by an annular screen 28 which serves to prevent sediment from within the tank 25 from collecting upon the valve seat 7. The lower interior portion of the main casing 6 is provided with a guide 28' for the valve stem 11; and the upper end of this stem is provided with a loop or eye 29, and is slidable in a central hole in the cover 13. One of the lower openings 8 of the casing 6 is normally sealed by a closure plate 30 coacting with a gasket 31 and detachably secured to the casing by studs and clamping nuts 32; and the other opening 8 communicates with a liquid dispensing pipe 33 having an integral flange 34 coacting with another gasket 31 and detachably secured to the casing 6 by studs and nuts 35, 36, the latter of which coacts with the pivot 15. The pipe 33 may thus be connected to either side of the casing 6, and the closure plate 30 serves to permit convenient access to the mechanism within the main casing without necessitating removal of the liquid dispensing pipe.

The valve cap 10 is rigidly attached to the stem 11, and the valve disk 9 is held within the recess of the cap 10 by means of a lower plate 37 and a nut 38 coacting therewith and with screw threads on the stem. The valve stem 11 may be moved longitudinally of its axis to compress the spring 12 and open the valve, either by means of a hook or cable applied to the eye 29, or by actuation of the bell-crank 14. The pivot 15 upon which the bell-crank 14 is swingably supported, is insertible or removable from the exterior of the casing 6 as clearly shown in Fig. 3. This pivot 15 has a reduced end portion snugly fitting alined bores in the casing 6 and upon which the bell-crank 14 is directly supported, and also has a threaded medial portion 39 and an integral flange 40 adjacent thereto. The threaded portion 39 coacts with screw threads in the casing 6, and the flange 40 coacts with a soft metallic sealing washer 41, thus positively preventing leakage of liquid past the pivot 15, and the pivot 15 also serves as a stud with which the nut 36 coacts to clamp either the pipe flange 34 or the closure plate 30 to the main casing 8.

As previously indicated, the lateral arm of the bell-crank 14 coacts with the lower extremity of the stem 11, while the depending arm coacts with the pin 17; and the latter of the bell-crank arms has a slot 42 with which the pin 17 coacts so as to prevent lateral pressure on the pin due to angular displacement of the bell-crank 14. The rod 16 has an integral flange 43 which is permanently attached to the movable end of the accordion or bellows seal 19 to provide a leak-proof joint, and the seal 19 is formed of flexible metal and has its opposite end secured to the bearing member 18 and casing 6 by means of studs and nuts 44 and sealed by a gasket 45. While the bellows seal 19 permits free reciprocation of the rod 16, it also insures a leak-proof joint for this rod, thereby further guarding against escape of liquid from within the casing 6 except through the pipe 33. The operating end of the rod 16 is connected to the actuating element 20 by means of a detachable coupling 46, and the element 20 is operable in any convenient manner from a remote station and may be housed within a tubular casing 47 detachably secured to an end of the bearing member 18 by means of a screw 48. Upon release of the screw 48, the casing 47 may be withdrawn axially from the member 18; whereupon the element 20 and the coupling 46 attached thereto, may be unscrewed from the rod 16 and subsequently likewise withdrawn.

The normal use and operation of the improved emergency valve should be clearly apparent from the foregoing description of the detailed construction thereof. When the valve unit has been properly assembled and applied to a container or tank 25, the valve disk 9 may be pressed into intimate engagement with the seat 7 on the casing 6, by the spring 12, as shown in Fig. 1, so as to cut-off communication between the tank and the pipe 33; or the disk 9 may be elevated from the seat 7 to open the valve either by pulling upwardly on the stem 11 from above, or by pulling on the rod 16 and thereby causing the bell-crank 14 to push upwardly against the lower end of the valve stem. Upon release of the opening force exerted against the stem 11 either from above or below, the compression spring 12 will immediately become effective to close the valve and will thus positively prevent further passage of liquid.

The improved valve assemblage can obviously be readily attached to or removed from the tank 25 with the aid of the studs and nuts 24, and the studs and nuts 32, 35, 36, 44 provide for convenient access to and removal of all parts of the mechanism. The gaskets 22, 31, 45 and the washer 41 and seal 19 positively prevent undesirable leakage or escape of liquid from within the valve casing 6, and the dispensing pipe 33 may be attached to either side of the main casing 6 without undesirable interference by the valve actuating mechanism, since this mechanism is extremely simple and compact and is located near the lower end of the casing 6 midway between the interchangeably available openings 8.

From the foregoing description it will be apparent that the present invention provides an improved emergency valve assemblage which is exceedingly simple, compact and durable in construction, which is thoroughly sealed against leakage, and which is readily manipulable and highly efficient in operation. The improved device may be applied or removed as a complete unit, has all parts conveniently accessible for inspection and adjustment, and is extremely flexible in assemblage and installation. The invention has proven highly successful in actual commercial use, especially as applied to truck tanks, and fully complies with the most stringent safety laws.

It should be understood that it is not desired to limit the invention to the exact details of construction and to the precise mode of operation, herein shown and described, for various modifications within the scope of the claims may occur to persons skilled in the art.

I claim:—

1. In a valve, a main casing having a seat and a chamber beneath said seat provided with an opening, a pipe detachably attached to said casing at said opening, a valve disk cooperable with said seat and having a stem projecting into said chamber, a lever within said chamber cooperable with said stem, an actuating rod for said lever, and a pivot for said lever piercing only one wall of said casing and forming means for attaching said pipe to said casing.

2. In a valve, a main casing having a seat and a chamber beneath said seat provided with an opening, a pipe detachably attached to said casing at said opening, a valve disk cooperable with said seat and having a stem projecting into said chamber, a lever within said chamber cooperable with said stem, an actuating rod for said lever, a pivot for said lever extending exteriorly of said casing and piercing only one wall thereof, and means coacting with said pivot for attaching said pipe to said casing.

3. In a valve, a casing having a seat and a chamber beneath said seat provided with an opening, closure means for said chamber attached to said casing at said opening, a valve disk cooperable with said seat and having an actuating portion extending into said chamber, an actuating lever within said chamber and cooperable with said actuating disk portion, a pivot for said lever extending exteriorly of said casing and piercing only one wall thereof, means coacting with said pivot for attaching said closure means to said casing, actuating means for said lever penetrating said casing, and seals interposed between said pivot and actuating means and said casing.

4. In a valve, a casing having a seat and a chamber provided with opposite alined openings, a valve disk cooperable with said seat and having a stem extending into said chamber midway between said openings, a closure plate for one of said openings, a pipe attached to said casing adjacent the other of said openings, a swingable lever within said chamber for actuating said disk through said stem, a rod penetrating said casing for actuating said lever, a bellows seal located entirely within said chamber and interposed between said rod and said casing in substantial alinement with said openings, and a pivot for said lever removable from the exterior of said casing and penetrating only one wall thereof.

5. A valve assemblage comprising, a main casing having a seat and a chamber beneath said seat provided with an opening, a pipe detachably attached to said casing at said opening, a valve member cooperable with said seat and having an actuating portion extending into said chamber, a lever within said chamber cooperable with said actuating portion, an actuating rod for said lever having a bellows seal disposed entirely within said chamber, and a pivot for said lever piercing only one wall of said casing and coacting with said pipe to connect said pipe and casing.

6. A valve assemblage comprising, a main casing having a seat and a chamber adjoining said seat provided with an opening, a pipe communicating with said chamber through said opening, a valve member cooperable with said seat and having an actuating portion extending into said chamber, a lever pivotally suspended within said chamber and cooperating with said valve actuating portion, a rigid actuating rod for said lever slidably associated with said casing, a bellows seal disposed entirely within said chamber and having its opposite ends secured respectively to said rod and casing, and a flexible cable for reciprocating said rod to swing said lever without subjecting said bellows to lateral displacement.

FREDERICK G. THWAITS.